United States Patent
Jeong et al.

(10) Patent No.: US 8,228,827 B2
(45) Date of Patent: Jul. 24, 2012

(54) METHOD AND APPARATUS FOR DETECTING CONTENTION DURING RANDOM ACCESS PROCEDURE IN A MOBILE COMMUNICATION SYSTEM

(75) Inventors: Kyeong-In Jeong, Hwaseong-si (KR); Gert Jan Van Lieshout, Staines (GB); Himke Van Der Velde, Staines (GB); Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 960 days.

(21) Appl. No.: 12/028,508

(22) Filed: Feb. 8, 2008

(65) Prior Publication Data

US 2008/0194243 A1    Aug. 14, 2008

(30) Foreign Application Priority Data

Feb. 9, 2007    (KR) ................. 10-2007-0014024

(51) Int. Cl.
*H04B 7/005* (2006.01)
(52) U.S. Cl. ........ 370/278; 370/310; 370/329; 455/450; 455/518
(58) Field of Classification Search .................. None
See application file for complete search history.

(56) References Cited

U.S. PATENT DOCUMENTS

| | | | |
|---|---|---|---|
| 6,810,258 B1 | 10/2004 | Vialen | |
| 6,917,602 B2 | 7/2005 | Toskala et al. | |
| 6,937,641 B2 | 8/2005 | Li et al. | |
| 2003/0223452 A1* | 12/2003 | Toskala et al. | 370/442 |
| 2004/0146019 A1 | 7/2004 | Kim et al. | |
| 2007/0161377 A1* | 7/2007 | Kodikara Patabandi et al. | 455/450 |
| 2007/0206531 A1* | 9/2007 | Pajukoski et al. | 370/329 |

FOREIGN PATENT DOCUMENTS

| | | |
|---|---|---|
| JP | 2010-507322 | 9/2009 |
| RU | 2005 121 539 | 1/2006 |
| WO | WO 03/100988 | 12/2003 |
| WO | WO 2008/051269 | 5/2008 |
| WO | WO 2008/054112 | 5/2008 |

OTHER PUBLICATIONS

3rd Generation Partnership Project; Technical Specification Group Radio Access Network; Physical Layer Aspects for Evolved Universal Terrestrial Radio Access (UTRA), Release 7, 3GPP TR 25.814 V7.1.0, Sep. 2006.
Romain Masson, E-UTRA RACH within the LTE System, Feb. 3, 2006.
TD Tech, Initial Random Access for LCR TDD, 3GPP TSG-RAN WG2 #56bis, R2-070105, Jan. 15-19, 2006.
Ericsson, E-UTRAN Random Access Procedure C-RNTI Assignment and HARQ on Message 4 with RACH Model, 3GPP TSG-RAN WG2 #56bis, R2-070365, Jan. 15-19, 2007.

* cited by examiner

*Primary Examiner* — Ayaz Sheikh
*Assistant Examiner* — Nicholas Sloms
(74) *Attorney, Agent, or Firm* — The Farrell Law Firm, P.C.

(57) ABSTRACT

A method and apparatus for detecting contention in an RA procedure in a mobile communication system is provided in which an L2/L3 message is received from a UE in uplink resources allocated to the UE by an RA preamble response message that was transmitted for an RA procedure initiated by the UE, a CR message associated the RA procedure is transmitted to the UE, if the L2/L3 message is an initial access message, and predetermined control information is transmitted to the UE on a downlink control channel without transmitting the CR message, if the L2/L3 message is not an initial access message.

14 Claims, 7 Drawing Sheets

METHOD AND APPARATUS FOR DETECTING CONTENTION DURING RANDOM ACCESS PROCEDURE IN A MOBILE COMMUNICATION SYSTEM

PRIORITY

This application claims priority under 35 U.S.C. §119(a) to a Korean Patent Application filed in the Korean Intellectual Property Office on Feb. 9, 2007 and assigned Serial No. 2007-14024, the contents of which are hereby incorporated by reference.

BACKGROUND OF THE INVENTION

1. Field of the Invention

The present invention generally relates to a mobile communication system. More particularly, the present invention relates to a method and apparatus for efficiently detecting contention, for reducing signaling overhead during a random access procedure.

2. Description of the Related Art

The Universal Mobile Telecommunications System (UMTS) is a $3^{rd}$ Generation (3G) asynchronous mobile communication system operating in Wideband Code Division Multiple Access (WCDMA), based on European mobile communication systems, Global System for Mobile Communications (GSM) and General Packet Radio Services (GPRS). The $3^{rd}$ Generation Partnership Project (3GPP) that standardized UMTS is now discussing Long Term Evolution (LTE) as the next generation of UMTS, the Evolved UMTS. The 3GPP LTE is a technology for enabling packet communications at or above 100 Mbps, aiming at commercialization by 2010. For deploying the LTE system, many communication schemes have been proposed. Among them, there are schemes of reducing the number of nodes on a communication line by simplifying a network configuration or of optimizing radio protocols for radio channels.

Figure 1:
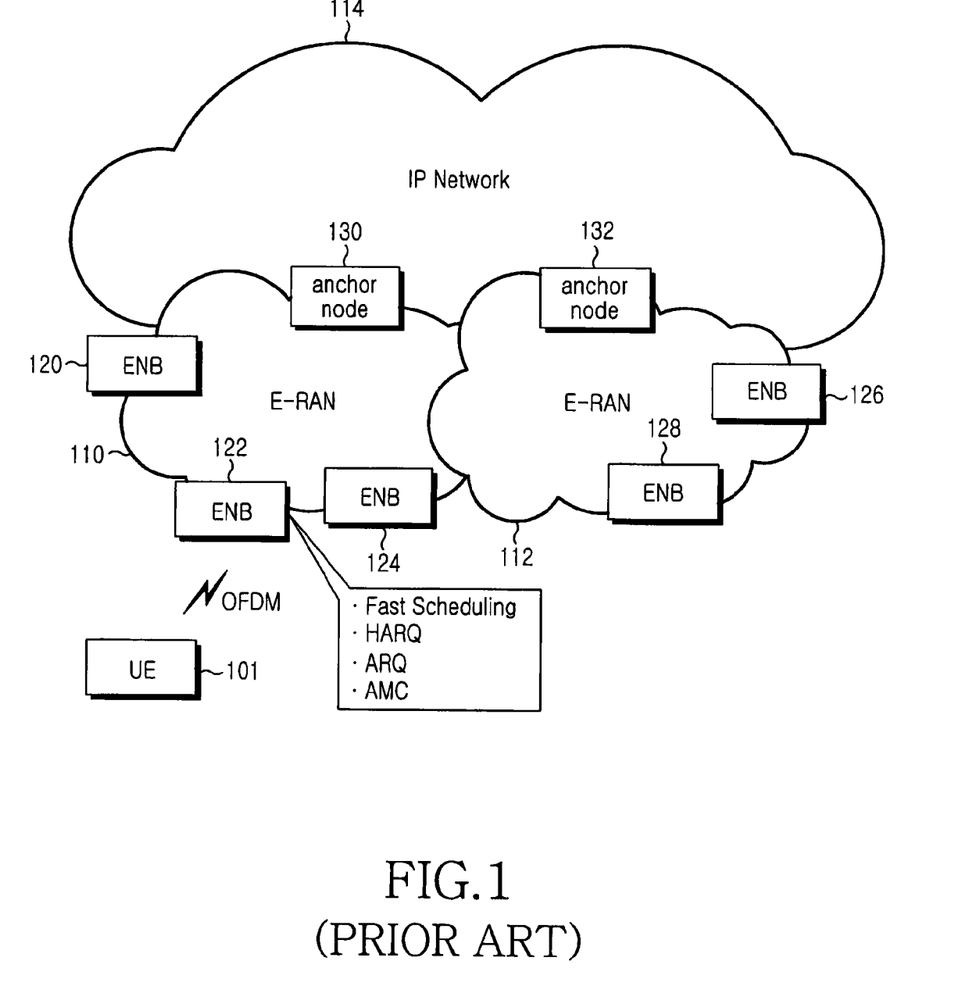
FIG. 1 is an exemplary view illustrating the configuration of a 3GPP LTE system.

FIG. 1 is an exemplary view illustrating an Evolved 3GPP LTE system.

Referring to FIG. 1, each of Evolved UMTS Radio Access Networks (E-UTRANs or E-RANs) 110 and 112 is simplified to a 2-node structure including Evolved Node Bs (ENBs) 120, 122, 124 and an anchor node 130, or ENBs 126 and 128 and an anchor node 132. A User Equipment (UE) 101 is connected to an Internet Protocol (IP) network 114 via the E-RAN 110 or 112. The ENBs 120 to 128 correspond to legacy Node Bs in the UMTS system and are connected to the UE 101 via radio channels.

Compared to the legacy Node Bs, the ENBs 120 to 128 play a more complex role. Since all user traffic including real-time service such as Voice over IP (VoIP) is serviced on shared channels in the 3GPP LTE, an entity for collecting the status information of UEs and scheduling them is required and the ENBs 120 to 128 are responsible for the scheduling. Generally, an ENB controls a plurality of cells.

The ENBs 120 to 128 also perform Adaptive Modulation and Coding (AMC) by selecting a modulation scheme and a channel coding rate for a UE adaptively according to the channel status of the UE. As with High Speed Downlink Packet Access (HSDPA) of UMTS and High Speed Uplink Packet Access (HSUPA) (or Enhanced Dedicated CHannel (EDCH)), the LTE system uses Hybrid Automatic Repeat reQuest (HARQ) between the ENBs 120 to 128 and the UE 101. Considering that a variety of Quality of Service (QoS) requirements cannot be fulfilled with HARQ alone, a high layer may perform an outer ARQ between the UE 101 and the ENBs 120 to 128. HARQ is a technique for increasing reception success rate by soft-combining previous received data with retransmitted data without discarding the previous data. High-speed packet communication systems such as HSDPA and EDCH use HARQ to increase transmission efficiency. To realize a data rate of up to 100 Mbps, it is expected that the LTE system will adopt Orthogonal Frequency Division Multiplexing (OFDM) in a 20-MHz bandwidth as a radio access technology.

Figure 2:
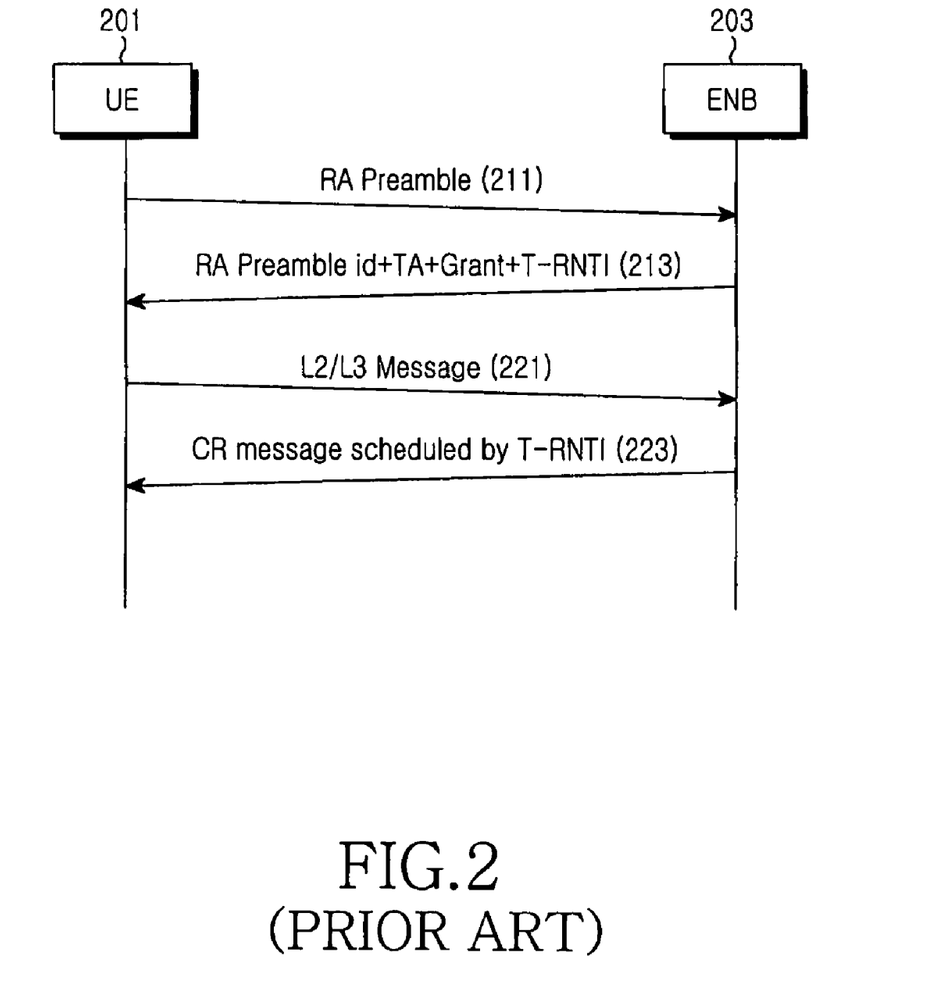
FIG. 2 is a diagram illustrating a conventional contention detection operation during an RA procedure.

FIG. 2 is a diagram illustrating a conventional contention detection operation during a Random Access (RA) procedure. Reference numeral 201 denotes a UE and reference numeral 203 denotes an ENB.

Referring to FIG. 2, the UE 201 selects one of predetermined code sequences called RA Preambles randomly or in a predetermined rule and transmits the selected RA Preamble on an asynchronous RA CHannel (aRACH) in step 211. In step 213, the ENB 203 transmits an RA Preamble response message including an RA Preamble Identifier (id or index) for the RA Preamble, Timing Advance (TA) information by which to adjust UpLink (UL) timing synchronization, Grant information indicating UL resources allocated for transmitting Layer 2/Layer 3 (L2/L3) messages, and a Temporary Radio Network Temporary ID (T-RNTI) being a temporary UE ID. After receiving the RA Preamble response message, the UE 201 checks the RA Preamble id and if the checked RA Preamble id is identical to that of the transmitted RA Preamble, it transmits an L2/L3 message in the uplink resources in step 221.

If a plurality of UEs transmit the same preamble to the ENB 203, contention occurs in the RA procedure. To notify the UE 201 of the successful reception of the RA Preamble, the ENB 203 schedules a Contention Resolution (CR) message including an ID specific to the UE 201 or a random ID received from the UE 201 using the T-RNTI and transmits it to the UE 201 in step 223. For this purpose, the UE 201 includes its unique ID or a smaller random ID in the L2/L3 message of step 221.

Each UE having a T-RNTI can determine from the ID included in the CR message whether it has won or lost the RA contention. If the CR message scheduled using the T-RNTI does not include the unique ID or random ID of the UE 201, the UE 201 re-starts the RA procedure, considering that it has lost the contention.

The use of the CR message clearly indicates to a user as to whether it has won or lost an RA contention. However, since a CR message need to be transmitted on the DownLink (DL) for each T-RNTI at each RA in the conventional procedure, signaling overhead is increased in terms of overall system performance.

SUMMARY OF THE INVENTION

An aspect of the present invention is to address at least the problems and/or disadvantages and to provide at least the advantages described below. Accordingly, an aspect of the present invention is to provide a method and apparatus for enabling a UE to detect a contention, while minimizing transmissions of a CR message and thus reducing signaling overhead during an RA procedure.

In accordance with an aspect of the present invention, there is provided a method for detecting contention in an RA procedure in a mobile communication system, in which an L2/L3 message is received from a UE in uplink resources allocated to the UE by an RA preamble response message that was transmitted for an RA procedure initiated by the UE, a CR message associated the RA procedure is transmitted to the UE, if the L2/L3 message is an initial access message, and predetermined control information is transmitted to the UE on a downlink control channel without transmitting the CR message, if the L2/L3 message is not an initial access message.

In accordance with another aspect of the present invention, there is provided an apparatus of a Node B for detecting contention in an RA procedure in a mobile communication system, in which a message analyzer determines whether an L2 µL3 message received from a UE is an initial access message, the L2/L3 message being received in uplink resources allocated to the UE by an RA preamble response message that the Node B transmitted for an RA procedure initiated by the UE, a message generator generates a CR message associated the RA procedure if the L2/L3 message is an initial access message, a control information generator generates control information specific to the UE, if the L2/L3 message is not an initial access message, and a transceiver receives the L2/L3 message, provides the L2/L3 message to the message analyzer, and transmits the CR message and the control information to the UE.

In accordance with a further aspect of the present invention, there is provided a method for detecting contention in an RA procedure in a mobile communication system, in which an L2/L3 message including a C-RNTI in uplink resources allocated by the RA preamble response message is transmitted, if the C-RNTI exists before the RA procedure starts, upon receipt of an RA preamble response message for the RA procedure from a Node B, an initial access message including an ID of the UE without the C-RNTI is transmitted in the uplink resources, if the C-RNTI does not exist, and the RA procedure is re-started, if control information specific to a UE has not been received on a downlink control channel or a CR message associated the RA procedure has not been received, within a predetermined time after transmitting one of the L2/L3 message and the initial access message.

In accordance with still another aspect of the present invention, there is provided an apparatus of a UE for detecting contention in an RA procedure in a mobile communication system, in which a transceiver receives an RA preamble response message from a Node B in the RA procedure and transmits an L2 µL3 message or an initial access message in uplink resources allocated by the RA preamble response message, a message generator generates the L2/L3 message including a valid C-RNTI, if the C-RNTI exists before the RA procedure starts and generates the initial access message including an ID of the UE without the C-RNTI, if the C-RNTI does not exist, and a message analyzer determines to re-start the RA procedure, if control information specific to the UE has not been received on a downlink control channel or a CR message associated the RA procedure has not been received, within a predetermined time after transmitting one of the L2/L3 message and the initial access message.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While the present invention will be described in the context of a 3GPP LTE system evolved from a 3GPP UMTS system, it is understood that the present invention is applicable to mobile communication systems with a similar channel structure.

In accordance with an embodiment of the present invention, an ENB transmits a CR message only when an L2/L3 message received from a UE is an initial access message in an RA procedure. If the L2/L3 message transmission is successful, the UE starts a timer. When the UE detects control information on a DL channel, which is mapped to or includes UE identification information being at least one of a Cell-RNTI (C-RNTI) that identifies the UE in a cell and a scrambling code before expiration of the timer, or when the UE receives a CR message including a unique ID of the UE or a random ID transmitted in the L2/L3 message, scheduled based on a T-RNTI set in an RA Preamble response message before expiration of the timer, the UE stops the timer and continues an on-going RA procedure. The control information includes at least one of scheduling information, ACKnowledge/Negative ACKnowledge (ACK/NACK) information, and a C-RNTI-specific Cyclic Redundancy Check (CRC). On the other hand, if the timer expires without receiving either of the control information and the CR message, the UE re-starts the RA procedure.

That is, the ENB allows message transmission through scheduling to a UE having a T-RNTI that the ENB transmitted in an RA Preamble response message. However, when an RA contention occurs, a plurality of UEs may have the same T-RNTI. Thus, to indicate the UE to which the ENB wants to transmit a CR message, it includes a unique ID of the UE or a random ID received from the UE in an L2/L3 message in the CR message. Herein, scheduling a CR message based on a T-RNTI means that the CR message is transmitted in resources indicated by scheduling information including the T-RNTI.

If the UE already has UE identification information such as a C-RNTI or a scrambling code, it can detect control information on a DL control channel in many ways. For example, the UE senses transmission of the control information for the UE on the DL control channel when: i) scheduling information uses a CRC mapped to the C-RNTI of the UE (i.e. a C-RNTI-specific CRC) and the UE detects no errors in the scheduling information received on the DL control channel by a CRC check using the C-RNTI, ii) an ACK/NACK for a transmitted UL message is encoded with the scrambling code allocated to the UE and transmitted to the UE and the UE detects the ACK/NACK using its scrambling code on the downlink control channel, or iii) the UE receives a control command including an explicit the C-RNTI of the UE on the DL control channel. In the present invention, control information means any kind of control information that can be signaled on a DL control channel.

Figure 3:
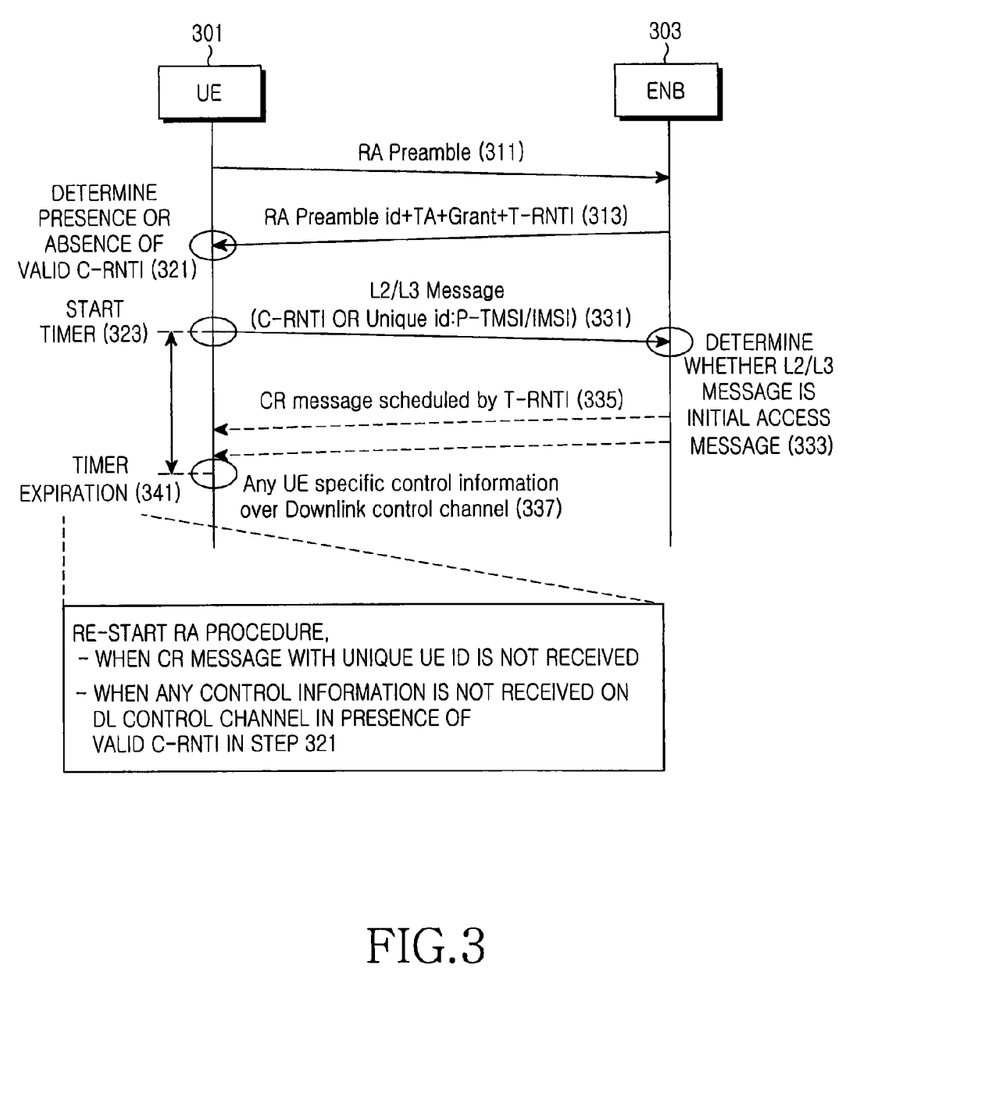
FIG. 3 is a diagram illustrating a contention detection operation during an RA procedure according to an embodiment of the present invention.

FIG. 3 is a diagram illustrating a contention detection operation during an RA procedure according to an embodiment of the present invention. Reference numeral 301 denotes a UE and reference numeral 303 denotes an ENB.

Referring to FIG. 3, the UE 301 selects one of predetermined RA Preambles randomly or in a predetermined rule and transmits the selected RA Preamble on a predetermined RA CHannel (RACH) in step 311. In step 313, the ENB 303 transmits an RA Preamble response message including an RA Preamble ID (or index) for the RA Preamble, TA information by which to adjust UL timing synchronization, Grant information indicating UL resources allocated for transmitting L2/L3 messages, and a T-RNTI being a temporary UE ID.

After receiving the RA Preamble response message, the UE 301 determines whether it already has a valid C-RNTI before the RA procedure in step 321. The C-RNTI is an ID allocated to a connected-mode UE for use in a cell. The C-RNTI is used to identify the UE during scheduling. The UE transmits an L2/L3 message using the Grant information in step 331. If the UE has the C-RNTI, it includes the C-RNTI in the L2/L3 message. Without the C-RNTI, the UE includes its unique ID such as a Packet-TMSI (P-TMSI) or an International Mobile Subscriber ID (IMSI) in the L2/L3 message. While not shown, the UE may include a random ID generated by the UE in the L2/L3 message, instead of the unique ID.

If the L2/L3 message transmission is successful, the UE 301 starts a timer in step 323. That is, the timer starts when the UE receives an ACK for the L2/L3 message from the ENB 303. It can be further contemplated as another embodiment of the present invention that the timer starts when the L2/L3 message is transmitted. It can be further contemplated as a third embodiment of the present invention that the timer starts when the UE 301 receives the RA Preamble response message or transmits the RA Preamble.

In step 333, the ENB 303 determines whether the L2/L3 message is an initial access message. An initial access message is a message that an idle-mode UE transmits to transition to a connected-mode. In general, the UE 301 does not have a valid C-RNTI when starting the RA procedure, the ENB 303 determines whether the UE 301 has the valid C-RNTI when starting the RA procedure by checking whether the L2/L3 message is an initial access message. If the L2/L3 message is an initial access message, the ENB 303 transmits a CR message scheduled based on a T-RNTI allocated to the UE 301, considering that the UE 301 does not have the valid C-RNTI in step 335. The CR message includes the unique ID of the UE or the random ID received in the L2/L3 message.

On the contrary, if the L2/L3 message is not an initial access message, the ENB 303 transmits control information using the C-RNTI on a DL control channel to the UE 301, considering that the LE 301 already has the valid C-RNTI in step 337. For example, the ENB 303 attaches a CRC mapped to the C-RNTI to a scheduling command to be transmitted to the UE, transmits a control command explicitly including the C-RNTI, or transmits an ACK/NACK encoded with the scrambling code allocated to the UE 301 for the received L2/L3 message.

When the UE 301 senses any control information destined for the UE 301 on a DL control channel or receives a CR message scheduled based on the T-RNTI and including the unique ID before expiration of the timer, it stops the timer and continues the on-going RA procedure, considering that it has won a contention that may occur during the RA procedure.

Meanwhile, if the UE 301 neither senses any control information destined for the UE 301 on the DL control channel nor receives a CR message scheduled based on the T-RNTI and including the unique ID until the expiration of the timer, it discontinues the on-going RA procedure and re-starts an RA procedure, considering that it has lost a contention that may occur during the RA procedure in step 341.

Figure 4:
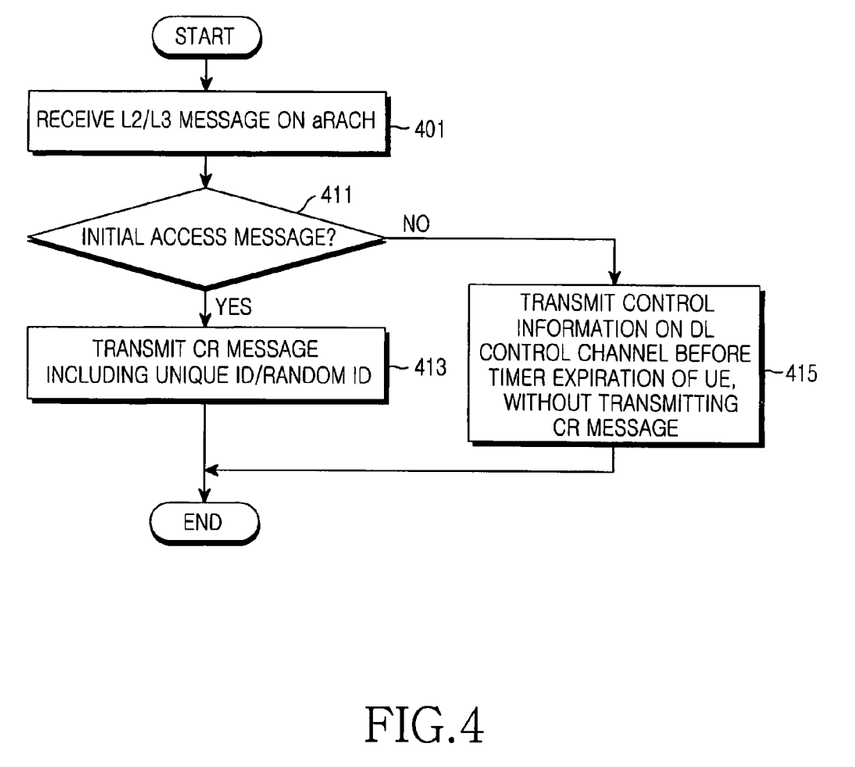
FIG. 4 is a flowchart of an operation of an ENB according to an embodiment of the present invention.

FIG. 4 is a flowchart of an operation of the ENB according to an embodiment of the present invention.

Referring to FIG. 4, the ENB receives an L2/L3 message on an asynchronous RACH (aRACH) from a UE in step 401. The L2/L3 message is a message that the UE transmits in UL resources allocated by an RA Preamble response message. In step 411, the ENB determines whether the L2/L3 message is an initial access message. In a modified embodiment of the present invention, the ENB may determine whether the L2/L3 message includes a valid C-RNTI that the UE has before an RA procedure.

If the L2/L3 message is an initial access message, the ENB transmits to the UE a CR message that is scheduled based on a T-RNTI allocated to the UE in the RA Preamble response message and that includes a unique ID or a random ID of the UE set in the L2/L3 message, considering that the UE does not have the C-RNTI in step 413. If the L2/L3 message is not an initial access message, the ENB considers that the UE has the valid C-RNTI and transmits control information on a DL control channel to the UE before expiration of a timer of the UE without transmitting the CR message in step 415. The control information includes control information encoded with the C-RNTI and a scrambling code allocated to the UE, or a CRC based on the C-RNTI.

Figure 5:
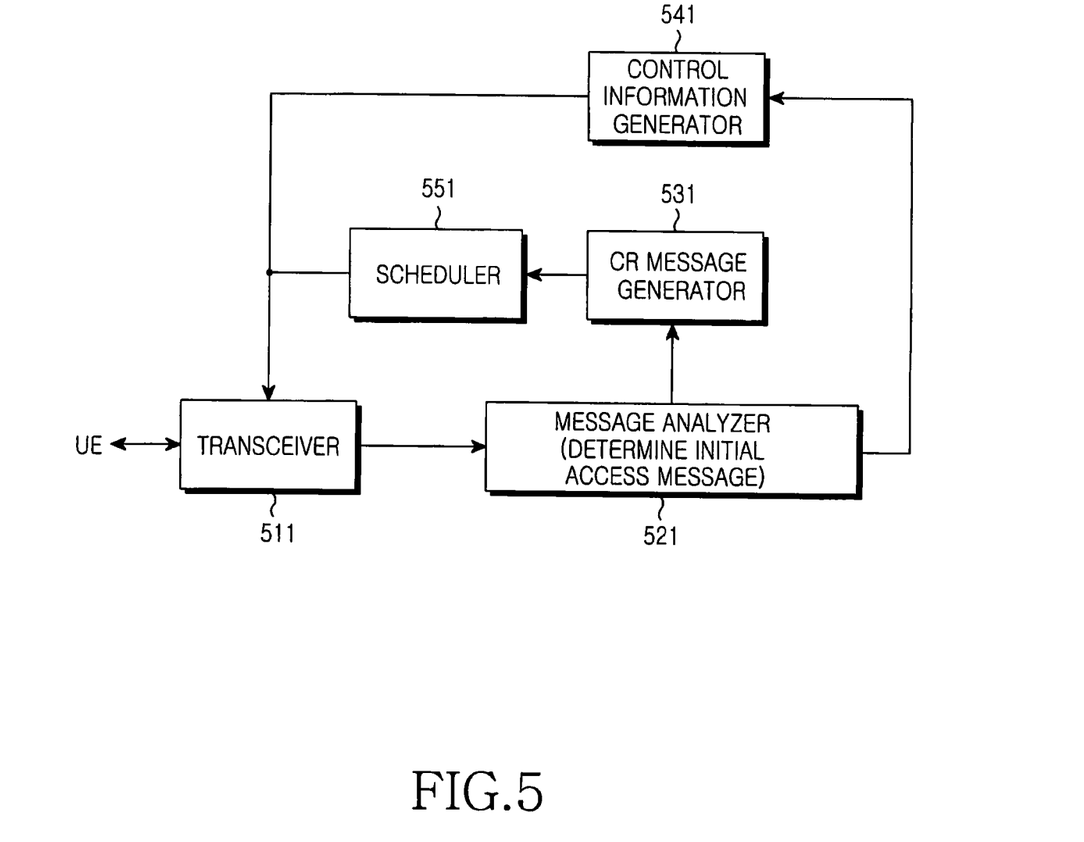
FIG. 5 is a block diagram of an ENB apparatus according to an embodiment of the present invention.

FIG. 5 is a block diagram of an ENB apparatus according to an embodiment of the present invention.

Referring to FIG. 5, a transceiver 511 is responsible for transmission and reception of a radio signal between the ENB and the UPE. Upon receipt of an L2/L3 message from the transceiver 511, a message analyzer 521 determines whether the L2/L3 message is an initial access message. If the L2/L3 message is an initial access message, a CR message generator 531 generates a CR message. A scheduler 551 schedules the CR message using a T-RNTI allocated to the UE by an RA Preamble response message and transmits the CR message to the UE through the transceiver 511. The CR message includes a unique ID or a random ID of the UE included in the L2/L3 message.

If the L2/L3 message is not an initial access message, the CR message is not transmitted. A control information generator 541 generates control information specific to the UE before expiration of a timer of the UE and transmits the control information to the UE on a DL control channel through the transceiver. The control information includes at least one of scheduling information corresponding to the C-RNTI and the scrambling code of the UE, an ACK/NACK, and a C-RNTI-specific CRC.

Figure 6:
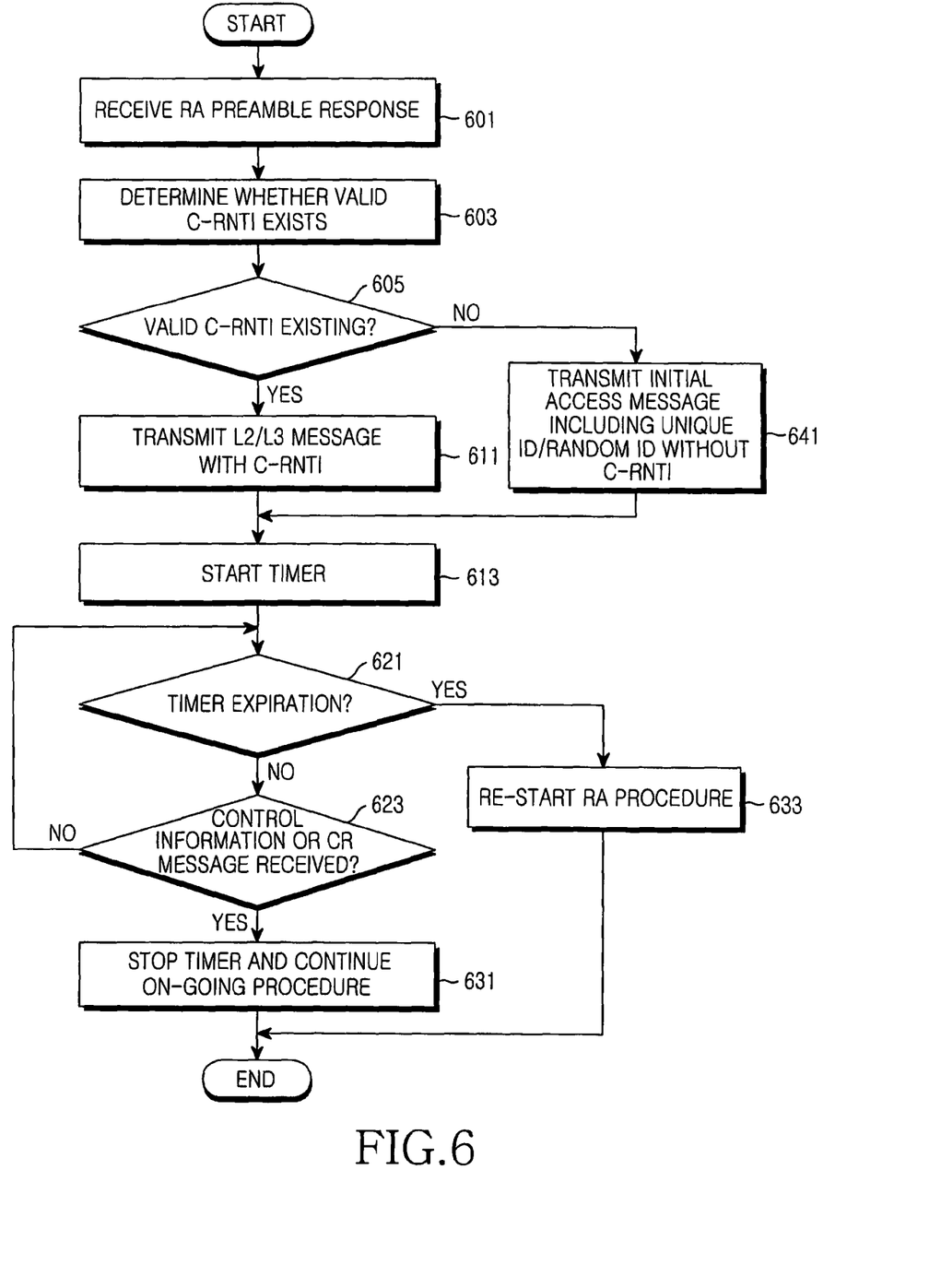
FIG. 6 is a flowchart of an operation of a UE according to an embodiment of the present invention.

FIG. 6 is a flowchart of an operation of the UE according to an embodiment of the present invention.

Referring to FIG. 6, the UE receives an RA Preamble response message for an RA Preamble transmitted on an aRACH from the ENB in step 601 and determines whether it already has a valid C-RNTI before starting an RA procedure in step 603. In the presence of the valid C-RNTI, the UE includes C-RNTI in an L2/L3 message and transmits the L2/L3 message in UL resources allocated by the RA Preamble response message in step 611. On the other hand, in the absence of the valid C-RNTI, the LYE generates an L2/L3 message (i.e. an initial access message) including a unique ID of the UE or a random ID generated by the UE and transmits the L2/L3 message in the UL resources allocated by the RA Preamble response message in step 641.

In step 613, the LYE starts a timer when it transmits the L2/L3 message or receives an ACK for the L2/L3 message from the ENB. The UE monitors expiration of the timer 621. If the timer is still running, the UE goes to step 623.

In step 623, the UE monitors whether any control information for the UE has been received on a DL control channel before the expiration of the timer, or a CR message has been received which was scheduled based on a T-RNTI acquired from the RA Preamble response message and includes the UE ID transmitted in step 641. If at least one of the control information and the CR message has been received, the UE stops the timer and performs a procedure corresponding to the received message in step 631. If neither the control information nor the CR message has been received until the expiration of the timer, the UE re-starts an RA procedure, re-transmits an RA Preamble, and awaits reception of an RA Preamble response message in step 633. While not shown, upon receipt of an RA Preamble response message for the retransmitted RA Preamble, the UE re-starts from step 601.

Figure 7:
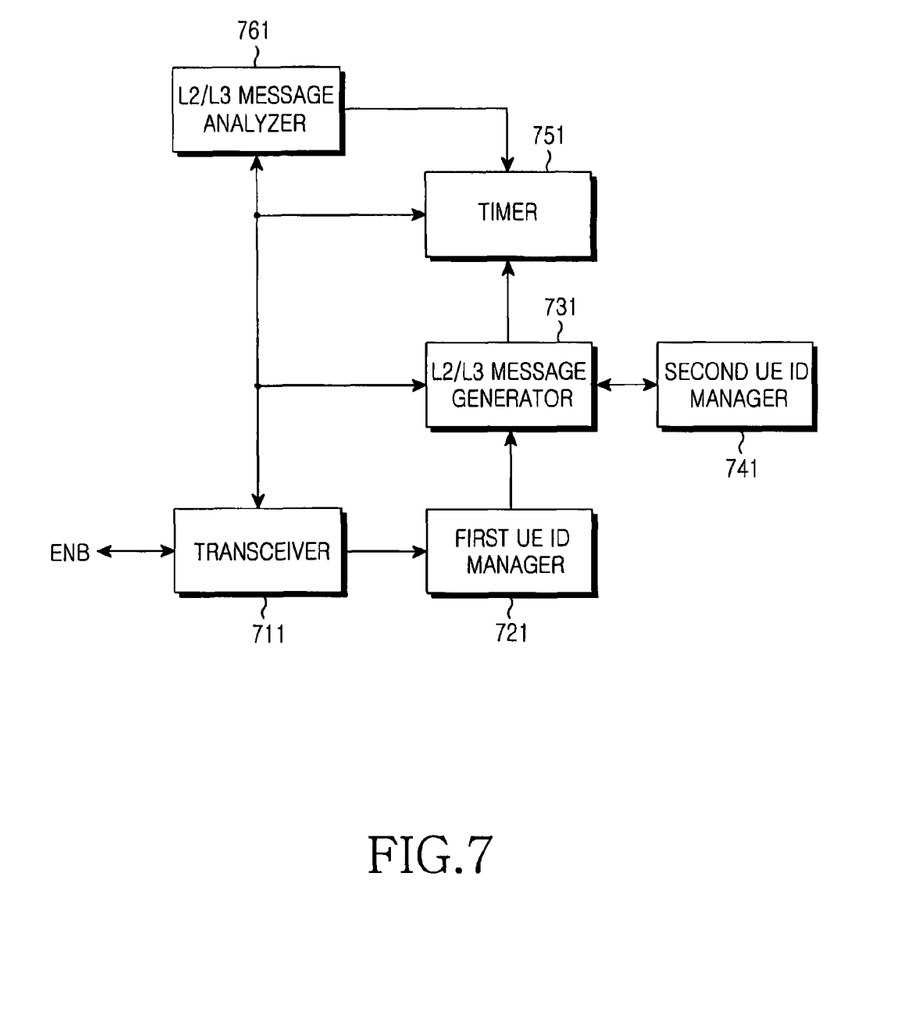
FIG. 7 is a block diagram of a UE apparatus according to an embodiment of the present invention.

FIG. 7 is a block diagram of a LYE apparatus according to an embodiment of the present invention.

Referring to FIG. 7, a transceiver 711 transmits and receives data and control information to and from the ENB. Upon receipt of an RA preamble response message through the transceiver 711, a first UE ID manager 721 extracts a T-RNTI from the RA Preamble response message and processes it. If the first UE ID manager 721 has a valid C-RNTI when the RA Preamble response message is received, a UL L2/L3 message generator 731 generates an L2/L3 message and includes the C-RNTI in the L2/L3 message. In the absence of the valid C-RNTI when the RA Preamble response message is received, a unique ID or a random ID of the UE processed in a second UE ID manager 741 is included in the L2/L3 message. The second UE ID manager 741 processes the unique ID such as a P-TMSI or an IMSI. When needed, the second UE ID manager 741 generates the random ID and provides it to the L2/L3 message generator 731.

The L2/L3 message is transmitted through the transceiver 711 and upon receipt of an ACK for the L2/L3 message from the ENB, a timer 751 starts. An L2/L3 message analyzer 761 monitors whether any control information for the UE has been received on a DL control channel, or a CR message has been received that was scheduled based on the T-RNTI and includes the unique ID or the random ID. If neither the control information nor the CR message has been received until the expiration of the timer, an RA procedure is re-started.

As is apparent from the above description, the present invention advantageously enables efficient contention detection, thereby reducing signaling overhead in an RA procedure.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for performing a random access procedure in a mobile communication system, the method comprising:
receiving a first message including a random access preamble;
transmitting a second message, which is a random access response message, in response to the first message;
determining whether or not a third message including a Cell-Radio Network Temporary Identifier (C-RNTI) is received from a User Equipment (UE);
transmitting a fourth message, which is a Contention Resolution (CR) message for the random access procedure, to the UE, upon receipt of the third message that does not include the C-RNTI from the UE; and
transmitting UE-specific control information to the UE, upon receipt of the third message including the C-RNTI from the UE,
wherein the UE-specific control information includes a Cyclic Redundancy Check (CRC) specifically mapped to the C-RNTI of the UE, and
wherein the first, second, third, and fourth messages occur in a random access procedure in a mobile communication system.

2. The method of claim 1, wherein the UE-specific control information is addressed by the C-RNTI.

3. The method of claim 1, wherein transmitting the UE-specific control information is performed before expiration of a timer activated for collision detection by the UE in the random access procedure.

4. The method of claim 1, wherein transmitting the UE-specific control information is performed on a downlink control channel.

5. An apparatus for performing a random access procedure in a mobile communication system, the apparatus comprising:
a transceiver for transmitting and receiving messages to and from a User Equipment (UE); and
a controller for controlling the transceiver to transmit a random access response message in response to receiving a message including a random access preamble, determining whether or not a message including a Cell-Radio Network Temporary Identifier (C-RNTI) is received from the UE, and controlling the transceiver to transmit a Contention Resolution (CR) message for the random access procedure to the UE, upon receipt of a message that does not include the C-RNTI from the UE, and to transmit UE-specific control information to the UE, upon receipt of the message including the C-RNTI from the UE,
wherein the UE-specific control information includes a Cyclic Redundancy Check (CRC) specifically mapped to the C-RNTI of the UE, and
wherein each of the messages occurs in a random access procedure in a mobile communication system.

6. The apparatus of claim 5, wherein the UE-specific control information is addressed by the C-RNTI.

7. The apparatus of claim 5, wherein the controller controls the transceiver to transmit the UE-specific control information before expiration of a timer activated for collision detection by the UE in the random access procedure.

8. The apparatus of claim 5, wherein transceiver transmits the UE-specific control information on a downlink control channel.

9. A method for performing a random access procedure in a mobile communication system, the method comprising:

receiving a first message, which is a random access response message from a Base Station (BS);

transmitting a second message including a Cell-Radio Network Temporary Identifier (C-RNTI) to the BS, if the C-RNTI exists;

activating a timer for collision detection in the random access procedure, when the message including the C-RNTI is transmitted;

determining that a contention for the random access procedure is resolved successfully, when User Equipment (UE)-specific control information addressable by the C-RNTI is received from the BS before expiration of the time; and determining that the contention for the random access procedure is not resolved successfully, if the UE-specific control information is not received from the BS before the expiration of the timer, wherein the UE-specific control information includes a Cyclic Redundancy Check (CRC) specifically mapped to the C-RNTI of the UE, wherein each of the messages occurs in a random access procedure in a mobile communication system.

10. The method of claim 9, further comprising;

transmitting a message that does not include the C-RNTI to the BS, if the C-RNTI does not exist;

determining if the contention for the random access procedure is resolved successfully, when a Contention Resolution (CR) message for the random access procedure is received from the BS.

11. The method of claim 9, wherein the UE-specific control information is received on a downlink control channel.

12. A User Equipment (UE) for a mobile communication system, comprising:

a transceiver for transmitting and receiving messages to and from a Base Station (BS); and a controller for controlling the transceiver to transmit a message including a Cell-Network Temporary Identifier (C-RNTI) to the BS, if the C-RNTI exists, upon receipt of a random access response message from the BS and activating a timer for collision detection in a random access procedure, determining that a contention for the random access procedure is resolved successfully, when User Equipment (UE)-specific control information addressable by the C-RNTI is received from the BS before expiration of the time; and determining that the contention for the random access procedure is not resolved successfully, if the UE-specific control information is not received from the BS before the expiration of the timer, wherein the UE-specific control information includes a Cyclic Redundancy Check (CRC) specifically mapped to the C-RNTI of the UE, wherein each of the messages occurs in a random access procedure in a mobile communication system.

13. The UE of claim 12, wherein the controller controls the transceiver to transmit a message that does not include the C-RNTI to the BS, if the C-RNTI does not exist, and to determine if the contention for the random access procedure is resolved successfully, when a Contention Resolution (CR) message for the random access procedure is received from the BS.

14. The UE of claim 12, wherein the UE-specific control information is received on a downlink control channel.

* * * * *